United States Patent [19]
Gordon et al.

[11] Patent Number: 6,097,552
[45] Date of Patent: Aug. 1, 2000

[54] AUTOFOCUS ACTUATOR DEVICE

[75] Inventors: Wayne L. Gordon, Boston; William T. Plummer, Concord; James J. Zambuto, Winchester, all of Mass.

[73] Assignee: Polaroid Corporation, Cambridge, Mass.

[21] Appl. No.: 09/323,186

[22] Filed: May 27, 1999

Related U.S. Application Data

[60] Provisional application No. 60/087,277, May 29, 1998, and provisional application No. 60/087,279, May 29, 1998.

[51] Int. Cl.[7] .................................. G02B 7/02; G11B 7/00
[52] U.S. Cl. ........................ 359/814; 359/813; 359/823; 369/44.15
[58] Field of Search .................................... 359/813, 814, 359/819, 823, 824, 822; 369/44.14, 44.15, 44.17, 44.21, 44.22

[56] References Cited

U.S. PATENT DOCUMENTS

| | | |
|---|---|---|
| 4,472,024 | 9/1984 | Konomura et al. .................. 359/814 |
| 4,542,289 | 9/1985 | Yokoyama et al. .................. 250/201.7 |
| 4,806,778 | 2/1989 | Yamamoto et al. ............... 250/559.29 |
| 4,984,229 | 1/1991 | Nedvidek .............................. 369/44.24 |
| 5,212,500 | 5/1993 | Harrigan .................................. 347/241 |
| 5,218,587 | 6/1993 | Nomiyama et al. ................. 369/44.16 |
| 5,361,243 | 11/1994 | Kasahara .............................. 369/44.15 |
| 5,493,546 | 2/1996 | Kasahara .............................. 369/44.15 |

*Primary Examiner*—Georgia Epps
*Assistant Examiner*—Saud Seyrafi
*Attorney, Agent, or Firm*—Barry Gaiman

[57] ABSTRACT

An actuator device for providing a focusing mechanism in an optical printer or optical recording device. The focusing optics are housed in a lens barrel which is maintained in position within a cylindrical winding of electrical wire by means of two diaphragm springs at the ends of the barrel. Movement of the barrel and the optics is affected by passing a current through the cylindrical winding to produce a longitudinal force on a permanent magnet secured to the lens barrel.

8 Claims, 4 Drawing Sheets

AUTOFOCUS ACTUATOR DEVICE

RELATED APPLICATIONS

This application claims the benefit of U.S. Provisional Application Nos. 60/087,277 entitled "Autofocus Actuator Device" filed on May 29, 1998 and 60/087,279 entitled "Autofocus Sensor Device" filed on May 29, 1998.

FIELD OF THE INVENTION

This invention in general relates to the field of optical focusing devices and, in particular, to an actuator for achieving focus of a recording beam in an optical printer or in an optical storage device.

BACKGROUND OF THE INVENTION

Optical printing and recording devices typically focus radiation from a source, such as a laser diode, onto a radiation sensitive recording medium. To provide a uniform amount of radiation per unit area on an uneven surface of the recording medium, it has generally been found necessary to provide an autofocus apparatus that operates continuously throughout the recording process.

U.S. Pat. No. 4,984,229 issued on Jan. 8, 1991 discloses an autofocus sensor and actuator device used to control the position of an objective lens in order to focus laser radiation onto a radiation sensitive recording medium. An independent source of radiation is used with a detector to provide a focus-error signal. The focus-error signal is used to control a current to an actuator having two moving coil linear motion solenoids suspended in a magnetic circuit.

One limit to recording speed is the ability to maintain the focus of the recording beam. In order to operate at higher recording speeds, it is desirable to have an autofocus system with a high frequency response. An improved frequency response can be obtained by either reducing the mass of the object being moved or increase the force. A limit to increasing the force is the amount of current which can be handled by magnetic coils and this is partially a function of the amount of heat which can be removed from the actuator. Another problem with moving coil solenoids is mechanical vibrations which occur at resonant frequencies, and these vibrations have a detrimental effect on focus. This is a common problem present in a moving coil configurations.

What is needed in the art is an actuator with linear motion, higher acceleration and reduced harmonic vibration. Also needed in order to achieve higher acceleration is a configuration to effectively dissipate the heat generated by the current flow through the electromagnetic coils. It is desired to create a more reliable and an easier to manufacture actuator than prior art designs.

This application incorporates by reference U.S. Provisional Application Nos. 60/087,277 entitled "Autofocus Actuator Device" filed on May 29, 1998 and 60/087,279 entitled "Autofocus Sensor Device" filed on May 29, 1998.

An efficient actuator with improved acceleration which has greater reliability and fewer moving parts which is can be manufactured easier than prior art devices is desired, and the present invention provides these features.

SUMMARY OF THE INVENTION

The invention relates to an autofocus actuator used in optical recording devices which require autofocus control of the radiation beam directed towards a radiation sensitive recording medium. In one embodiment the autofocus actuator includes a housing and a pair of diaphragm springs which retain an objective lens mounted in a lens barrel in the housing. A cylindrical permanent magnet enclosing the lens barrel and is surrounded by a pair of fixed coils mounted in the housing. Control circuitry regulates the current to the fixed coils in response to a focus-error signal to generate longitudinal forces along the direction of the illuminating beam to adjust the focus. In this embodiment there are no moving electrical leads. In one embodiment a beryllium copper diaphragm springs are use to provide stiffness to prevent the lens barrel from rotating and to reduce mechanical vibrations.

An object of the invention is to provide an autofocus actuator which is capable of providing higher acceleration and thereby better frequency response than prior art devices. A further object of the invention is to provide better reliability and ease of manufacture by using fewer moving parts and providing for the dissipation of heat generated by the current flow in the coils.

These and other objects, along with advantages and features of the invention disclosed herein, will be made more apparent from the description, drawings and claims that follow.

BRIEF DESCRIPTION OF THE DRAWINGS

These and other features of the invention are more fully set forth in the detailed description and drawing of which.

DESCRIPTION OF THE PREFERRED EMBODIMENTS

Figure 1:
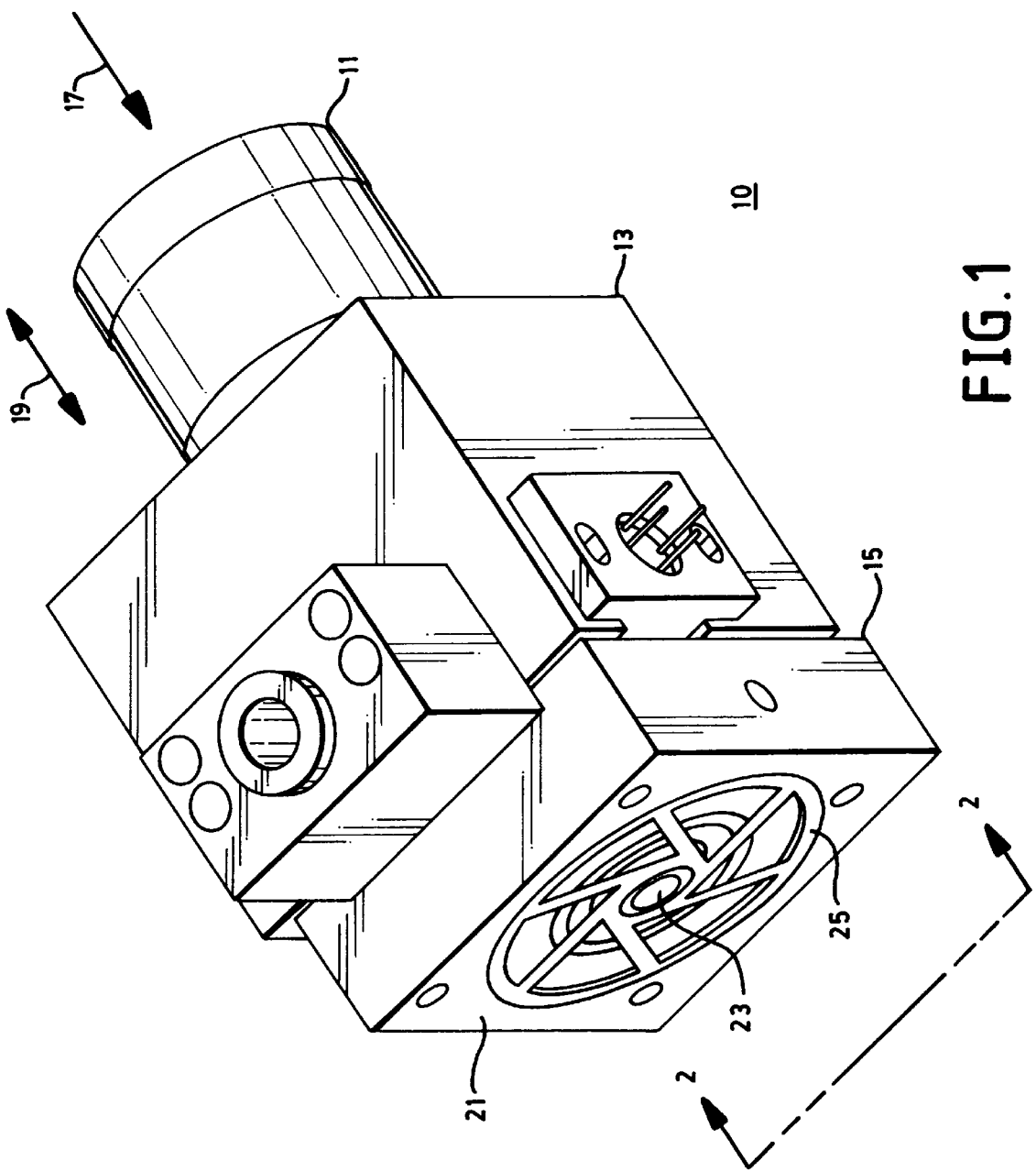
FIG. 1 is a diagrammatic perspective view of an autofocus assembly comprising a mounting arm, an optical feedback section, and an autofocus actuator.

There is shown in FIG. 1 a diagrammatical perspective view of an autofocus assembly 10, according to the present invention, suitable for use in an optical printer for writing onto a photosensitive recording medium or in an optical recording device for writing onto the surface of an optical storage medium by means of externally-supplied recording illumination 17, such as collimated light from a laser source (not shown). In the process of writing to the recording surface, the distance from the focusing module to the recording surface can vary (e.g., as a result of the radial movement of a photosensitive medium in a drum printer or as a result of lateral movement in the rotation of an optical storage disc). A method for automatically, efficiently, and rapidly focusing recording illumination 17 onto the recording surface becomes necessary.

Autofocus assembly 10 comprises a mounting arm 11, an optical feedback section 13, and an autofocus actuator 15. In the embodiment shown, mounting arm 11 is configured for placement into a vee-shaped groove (not shown) which provides for positional adjustment of autofocus assembly 10 along a longitudinal axis, as indicated by arrow 19. Optical feedback section 13 comprises an optical system which, combined with an external autofocus laser source, provides for controlling the operation of autofocus actuator 15.

Autofocus actuator 15 comprises a housing 21 and an objective lens 23 mounted to housing 21 by means of a forward diaphragm spring 25. During operation of autofocus assembly 10, recording illumination 17 is brought to focus on the recording medium by the appropriate longitudinal positioning of objective lens 23. In a preferred embodiment, objective lens 23 comprises a high numeric aperture aspheric glass lens element so as to allow the use of recording illumination of relatively high power. With high power recording illumination, a smaller laser spot can be produced at the recording surface.

Figure 2:
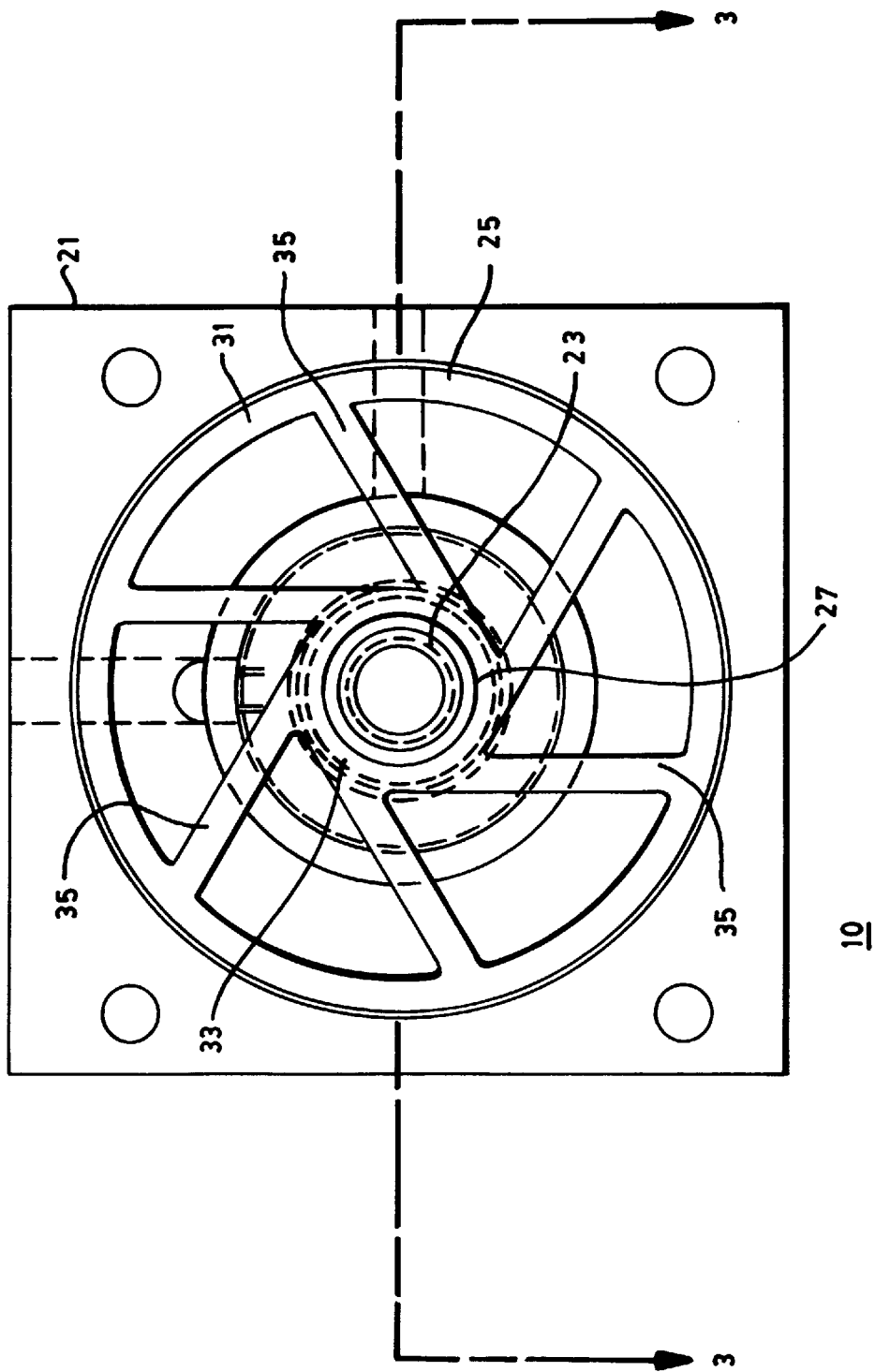
FIG. 2 is an elevational view of the autofocus actuator of FIG. 1.

FIG. 2 is a side view of autofocus actuator 15 showing placement of forward diaphragm spring 25 in housing 21. Forward diaphragm spring 25 comprises an outer ring 31, an inner ring 33, and three or more flexible arms 35. While six flexible arms 35 are shown in the illustration, it should be understood that the preferable number will depend upon the material used for the spring as well as the spring parameters desired in the particular application. In a preferred embodiment forward diaphragm spring 25 is formed from 0.003 inch thick beryllium copper. Objective lens 23 is secured to a lens barrel 27 which extends into housing 21. Lens barrel 27 is, in turn, secured to inner ring 33.

Figure 3:
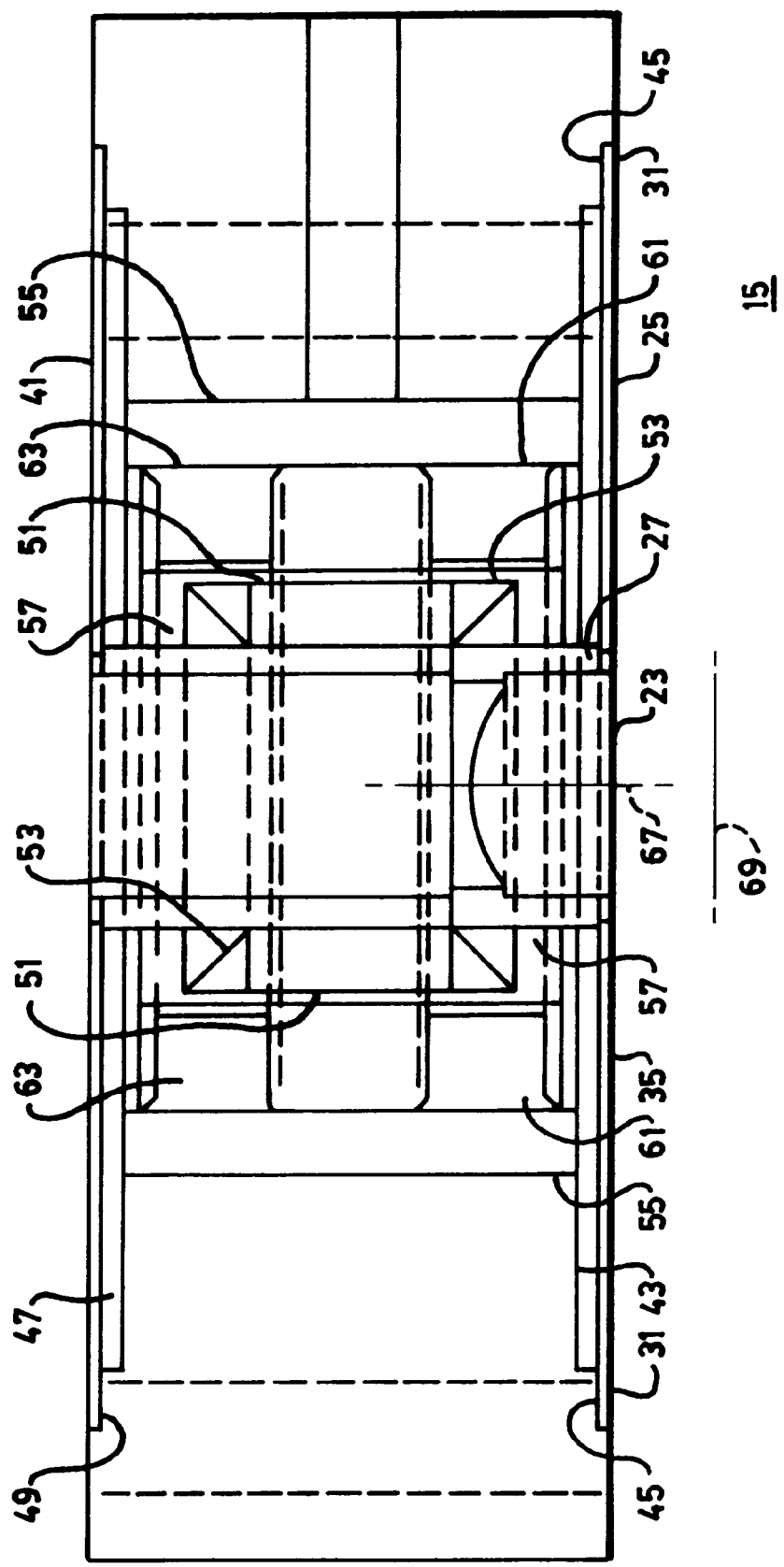
FIG. 3 is a cross sectional view of the autofocus actuator of FIG. 2.

FIG. 3 provides a cross-sectional view of autofocus actuator 15 as defined by the section lines in FIG. 2. Lens barrel 27 is secured to and is suspended between forward diaphragm spring 25 and a rearward diaphragm spring 41. Rearward diaphragm spring 41 comprises an inner ring, an outer ring, and flexible arms (not shown), similar in configuration to that of forward diaphragm spring 25. A clearance region 43 is provided in housing 21 behind forward diaphragm spring 25. Clearance region 43 is smaller than the planar dimension of forward diaphragm spring 25 so as to provide for mounting of outer ring 31 into a shoulder region 45 while also allowing for longitudinal movement of flexible arms 35 into and out of clearance region 43. Similarly, there is provided a rearward clearance region 47 and a shoulder region 49 to allow for longitudinal movement of the inner portion of rearward diaphragm spring 41 into and out of clearance region 47. It can be appreciated that this configuration provides for longitudinal movement of objective lens 23 within housing 21 and thus restricts movement of objective lens 23 to a single degree of freedom although a negligible amount of rotation of objective lens 23 does occur with the longitudinal movement.

Enclosing lens barrel 27 is a cylindrical permanent magnet 51. Magnet 51 comprises a hollow cylinder magnetized along the cylindrical axis and is preferable fabricated from a material such as NdFeB. Preferably, there are also emplaced metal rings 53 enclosing lens barrel 27 and lying on both sides of magnet 51. Rings 53 are triangular in cross section, as shown, and serve to redirect the flux lines from magnet 51 into a back iron 55 and thus confine them within housing 21. A generally cylindrical space 57 (i.e., a gap of approximately 0.010 inch) surrounds lens barrel 27, magnet 51, and rings 53 so as to allow for the free longitudinal movement of objective lens 23 within housing 21, that is, along optical axis 67 of objective lens 23.

Movement of objective lens 23 for focusing is achieved by an electromagnetic field generated by means of a forward coil 61 and a rearward coil 63, each coil positioned approximately at a respective end of magnet 51. Forward coil 61 and rearward coil 63 are secured to housing 21 and do not move during focusing operations. Accordingly, electrical leads (not shown) which supply electrical current to forward coil 61 and rearward coil 63 likewise remain stationary during focusing operations. Longitudinal movement of objective lens 23 is accomplished by applying appropriate electrical currents to forward coil 61 and to rearward coil 63. This action results in an electromagnetic field producing a longitudinal force on magnet 51, which causes a corresponding longitudinal force against forward diaphragm spring 25 and rearward diaphragm spring 41. Forward diaphragm spring 25 and rearward diaphragm spring 41 produce forces opposed to those resulting from the electromagnetic field. As a result, objective lens 23 moves to an equilibrium position to achieve the desired focus at a focal plane 69 corresponding to the surface of the recording medium.

Figure 4:
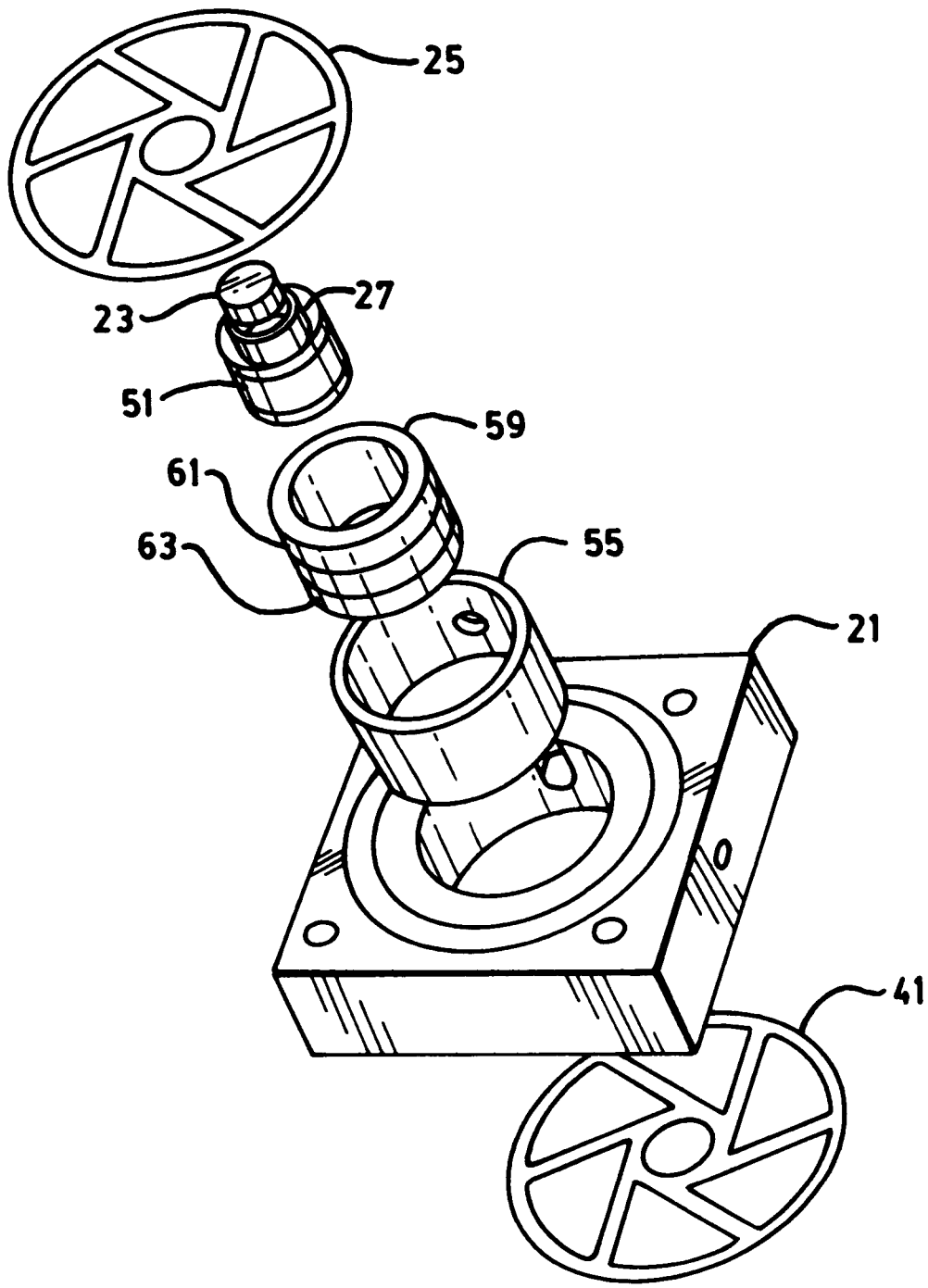
FIG. 4 is an exploded perspective view of the autofocus actuator of FIG. 2.

FIG. 4 provides an exploded view of autofocus actuator 15 showing the relative positions of back iron 55, a coil bobbin 59, and lens barrel 27 within housing 21. Coil bobbin 59 comprises forward coil 61 and rearward coil 63. Objective lens 23 is retained within lens barrel 27 and both are inserted into magnet 51. Lens barrel is held within housing 21 by means of forward diaphragm spring 25 and rearward diaphragm spring 41.

Among the advantages realized in the disclosed design is the efficient dissipation of waste heat from forward coil 61 and rearward coil 63 into housing 21. This allows for higher current levels to provide a larger electromagnetic field and a greater ability of focusing module 10 to track the fluctuations of the recording surface. For example, a device fabricated in accordance with the present disclosure demonstrated movement of an objective lens of approximately 500 $\mu$m in 1 msec. The restriction of objective lens 23 to a single degree of freedom further aids in fast response times. Furthermore, the disclosed moving lens barrel and magnet configuration is a relatively rigid configuration and, accordingly, does not incur resonances typically present in a moving-coil configuration.

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. An autofocus actuator for use in an optical system for focusing recording illumination onto the surface of radiation-sensitive medium comprising:

a housing;

a forward diaphragm spring disposed on said housing;

a rearward diaphragm spring disposed on said housing opposite said forward spring;

a lens barrel movably attached and secured to said forward diaphragm spring and to said rearward diaphragm spring;

an objective lens disposed in said lens barrel;

a cylindrical permanent magnet enclosing said lens barrel;

at least two fixed coils mounted in thermal communication with said housing surrounding said cylindrical permanent magnet;

a current means in electrical communication with each of said plurality of fixed coils wherein a longitudinal force is applied to said cylindrical permanent magnet in the direction of the recording illumination; and a control means regulating said current means.

2. The autofocus actuator as recited in claim 1 wherein the forward diaphragm spring and rearward diaphragm spring are constructed from beryllium copper.

3. The autofocus actuator as recited in claim 1 wherein said forward diaphragm spring further comprises an outer ring, an inner ring, and at least three flexible arms.

4. The autofocus actuator as recited in claim 1 wherein said rearward diaphragm spring further comprises an outer ring, an inner ring, and at least three flexible arms.

5. The autofocus actuator as recited in claim 1 wherein said objective lens comprises a high numeric aperture aspheric glass lens element so as to allow the use of recording illumination of relatively high power.

6. The autofocus actuator as recited in claim 1 wherein said cylindrical permanent magnet is constructed from NdFeB.

7. The autofocus actuator as recited in claim 1 wherein said housing further comprises a back iron to enhance the effectiveness of the magnetic force applied to said cylindrical permanent magnet.

8. A method for focusing radiation onto the surface of radiation-sensitive medium comprising the steps of:

provided a first source of optical radiation;

providing a second source of radiation;

Providing a detector to measure said second source of radiation;

deriving a focus-error signal from said second source of radiation;

supplying current to at least two fixed coils to move an objective lens contained in a lens barrel enclosed by a permanent magnet to focus said first source of radiation and said second source of radiation to reduce said focus-error signal; and providing a housing in thermal communication with said at least two fixed coils to dissipate heat generated by the current flowing through said at least two fixed coils.

* * * * *